United States Patent [19]

Kurokawa et al.

[11] Patent Number: 5,657,084
[45] Date of Patent: Aug. 12, 1997

[54] VIDEO TAPE RECORDER INTEGRATED WITH CAMERA

[75] Inventors: Yoshiyuki Kurokawa; Yoshihiro Ishikawa; Michihiro Miyake; Masayuki Yoshida, all of Asaka, Japan

[73] Assignee: Fuji Photo Film Co., Ltd., Kanagawa, Japan

[21] Appl. No.: 680,106

[22] Filed: Jul. 15, 1996

Related U.S. Application Data

[63] Continuation of Ser. No. 202,172, Feb. 25, 1994, abandoned.

[30] Foreign Application Priority Data

Mar. 1, 1993 [JP] Japan .................................. 5-040106

[51] Int. Cl.$^6$ .................................................. H04N 5/225
[52] U.S. Cl. ............................................ 348/373; 348/376
[58] Field of Search ...................................... 348/373, 376, 348/372, 208; 358/906; D16/200, 202, 208, 213; H04N 5/225

[56] References Cited

U.S. PATENT DOCUMENTS

| D. 349,910 | 8/1994 | Takano et al. | D16/202 |
|---|---|---|---|
| 5,132,800 | 7/1992 | Wada et al. | 348/372 |

FOREIGN PATENT DOCUMENTS

| 137073 | 1/1978 | Japan . | |
|---|---|---|---|
| 62-180681 | 8/1986 | Japan . | |
| 2026185 | 1/1990 | Japan | H04N 5/225 |
| 4114568 | 4/1990 | Japan . | |
| 3089682 | 4/1991 | Japan | H04N 5/225 |
| 3229577 | 10/1991 | Japan | H04N 5/225 |
| 5110914 | 4/1993 | Japan | H04N 5/225 |

*Primary Examiner*—Wendy Garber

[57] ABSTRACT

An outer case of a VTR integrated with a camera is formed to provide a substantially flat rectangular parallelepiped, so that the VTR becomes compact in size and has excellent portability. A shortest dimension of the parallelepiped-shaped case, an optical axis of the lens, and a shortest dimension of the video cassette tape are substantially parallel to a line pointing to a subject being recorded on video tape. During the engaging operation of a taking button, a thumb of a right hand supports the outer case from the rear surface thereof against a pushing force of the taking button. That is, the operation of pushing the taking button is the same as the operation of clamping the outer case between a thumb and a forefinger, so that no camera shake is caused during the operation of the button. Furthermore, a liquid crystal display portion is positioned at a position adjacent to an optical view finder, so that the content displayed in the liquid crystal display portion can be immediately recognized at a position where eyes are not diverted from the optical view finder. Further, a stereo microphone is provided on the top of the VTR integrated with a camera, so that the sounds from behind the VTR integrated with a camera can be recorded and the sound quality and realism can be improved.

19 Claims, 5 Drawing Sheets

VIDEO TAPE RECORDER INTEGRATED WITH CAMERA

This application is a continuation of application Ser. No. 08/202,172 filed on Feb. 25, 1994, now abandoned.

BACKGROUND OF THE INVENTION

1. Field of the Invention

This invention relates to a video tape recorder (hereinafter briefly referred to as a "VTR") and more particularly to a VTR integrated with a camera, being compact in size and conveniently portable.

2. Description of the Related Art

As shown in FIGS. 4 and 5, the VTR integrated with a camera has heretofore included a tape deck 1, a taking lens 2, a view finder 3 and the like, and has an outer shape of a substantially rectangular parallelepiped which is in a direction indicated by an arrow A in FIG. 4 as a whole i.e., the longest dimension of the parallelepiped is substantially parallel to a line pointing to the subject being recorded on video tape. Furthermore, the tape deck 1 is positioned at a side portion of the VTR integrated with a camera with respect to a subject, i.e., the shortest dimension of the tape in the tape deck is also substantially parallel to a line pointing to the subject.

When recording is performed by use of the above-described VTR integrated with a camera, a side grip formed on another side portion opposed to the tape deck 1 is gripped by a right hand, and a taking/recording button (not shown), is pushed by a thumb of the right hand to thereby start the recording, while a zoom button 4 is operated by a forefinger or middle finger of the right hand, and tele/wide is switching button is operated to thereby perform the recording.

Also, a liquid crystal display 5 is provided in close proximity of the zoom button 4 on the top surface of the VTR integrated with a camera, and date, current time, the remaining amount of a VTR tape and the like are displayed in this liquid crystal display 5.

Furthermore, as shown in FIG. 5, a stereo microphone 6 is positioned on the top of the front surface of the VTR integrated with a camera. As shown in FIG. 6, in the stereo microphone 6 covered by a net 7, there is provided one microphone unit 8A on the right side and another microphone unit 8B on the left side, both of which are respectively preset at predetermined stereo angles, and fixed to a microphone holder 9.

However, the taking lens 2 is positioned at one side opposed to the tape deck 1 in the conventional VTR integrated with a camera, whereby a lens housing 2A of the taking lens 2 has a shape of a bulge. With this arrangement, the conventional VTR integrated with a camera presents such disadvantages that it is large-sized and the portability thereof is unsatisfactory.

Furthermore, in the conventional VTR integrated with a camera, when the operating button or the zoom button 4 is operated, camera shake is caused due to a force of pushing the button, and further, the liquid crystal display portion 5 is positioned at a position apart from the view finder 3, thereby presenting such a disadvantage that the content displayed in the liquid crystal display portion 5 cannot be recognized at the position where the eye must be diverted from the view finder 3, which also adds to the problem of camera shake.

On the other hand, the stereo microphone 6 in the conventional VTR integrated with a camera is positioned on the front surface of the VTR integrated with a camera, thus presenting such a disadvantage that the sounds from the rear of the VTR integrated with a camera are interrupted by the body of the VTR integrated with a camera, so that the sound quality and realism is diminished.

SUMMARY OF THE INVENTION

The present invention has been developed to eliminate the above-described disadvantages and has as its object the provision of a VTR integrated with a camera, wherein the VTR is compact in size and has better portability, and in addition the content displayed in the liquid crystal display portion can be recognized at a position where eyes are not diverted from the view finder, and the sound quality and realism is improved.

To achieve the above-described object, in the VTR integrated with a camera, wherein a tape deck, a taking lens and a view finder are positioned in an outer case thereof, the outer case is formed to provide a substantially flat rectangular parallelepiped, the taking lens is positioned in the outer case in such a manner that a taking optical axis is in parallel to the shortest side of the outer case, and the tape deck is positioned in the outer case in such a manner that the surface of a video cassette is in parallel to the front of the outer case during recording.

Furthermore, to achieve the above-described object, in the VTR integrated with a camera, wherein the tape deck, taking lens, and view finder are positioned in an outer case, the outer case is formed to provide the substantially flat rectangular parallelepiped, the taking lens is positioned in the outer case in such a manner that the taking optical axis is in parallel to the shortest side of the outer case, the tape deck is positioned in the outer case in such a manner that the surface of the video cassette is in parallel to the front of the outer case during recording, and the liquid crystal display portion is positioned at a position adjacent the view finder at the rear surface of the outer case.

Further, to achieve the above-described object, in the VTR integrated with a camera, wherein the tape deck, taking lens, view finder and the like are positioned in the outer case, the outer case is formed to provide the substantially flat rectangular parallelepiped, the taking lens is positioned in the outer case in such a manner that the taking optical axis is in parallel to the shortest side of the outer case, the tape deck is positioned in the outer case in such a manner that the surface of the video cassette is in parallel to the front of the outer case during recording, and a microphone is positioned on the top of the outer case.

According to the present invention, the outer case of the VTR integrated with a camera is formed to provide the substantially flat rectangular parellelepiped, and the tape deck, taking lens, view finder and the like are positioned in this outer case, so that the VTR becomes compact in size and has excellent portability.

Furthermore, when the taking button or the like is engaged by the forefinger of the hand holding the gripping portion, the thumb of the hand supports the outer case against the repelling force of the button from behind, so that no camera shake is caused during the operation of the button.

Further, the liquid crystal display portion is positioned in a position adjacent to the view finder, so that the content displayed in the liquid crystal display portion can be easily recognized at the position where the eyes are not diverted from the view finder.

Furthermore, the microphone is provided on the top of the VTR integrated with a camera, and the sounds from behind the VTR integrated with a camera are recorded, so that the sound quality and realism can be improved.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein.

DESCRIPTION OF THE PREFERRED EMBODIMENT

Detailed description will hereafter be given of the preferred embodiment of the VTR integrated with a camera therefor according to the present invention with reference to the accompanying drawings.

Figure 1:
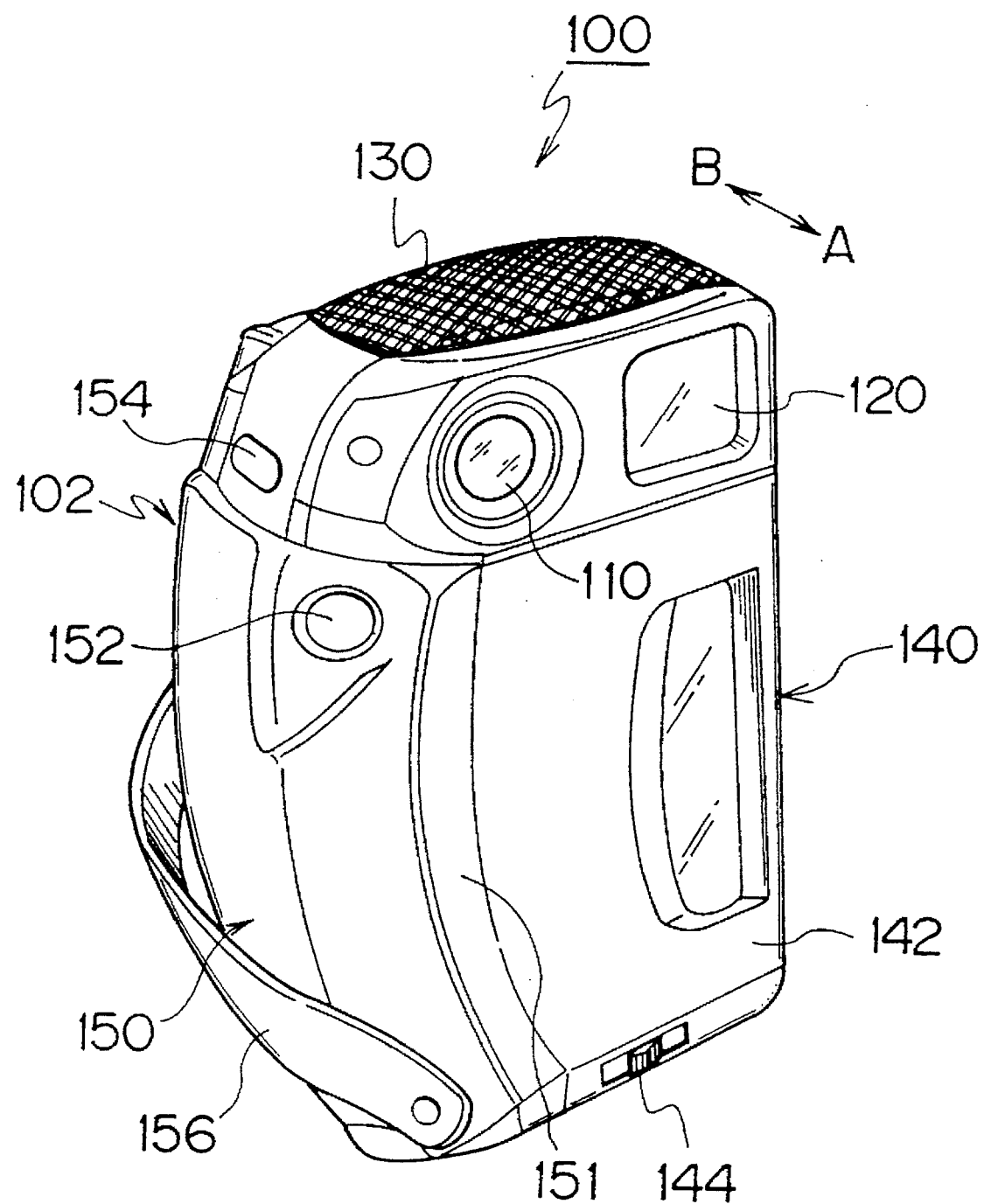
FIG. 1 is an oblique view, in which the VTR integrated with a camera according to the present invention is seen from the front.
Figure 2:
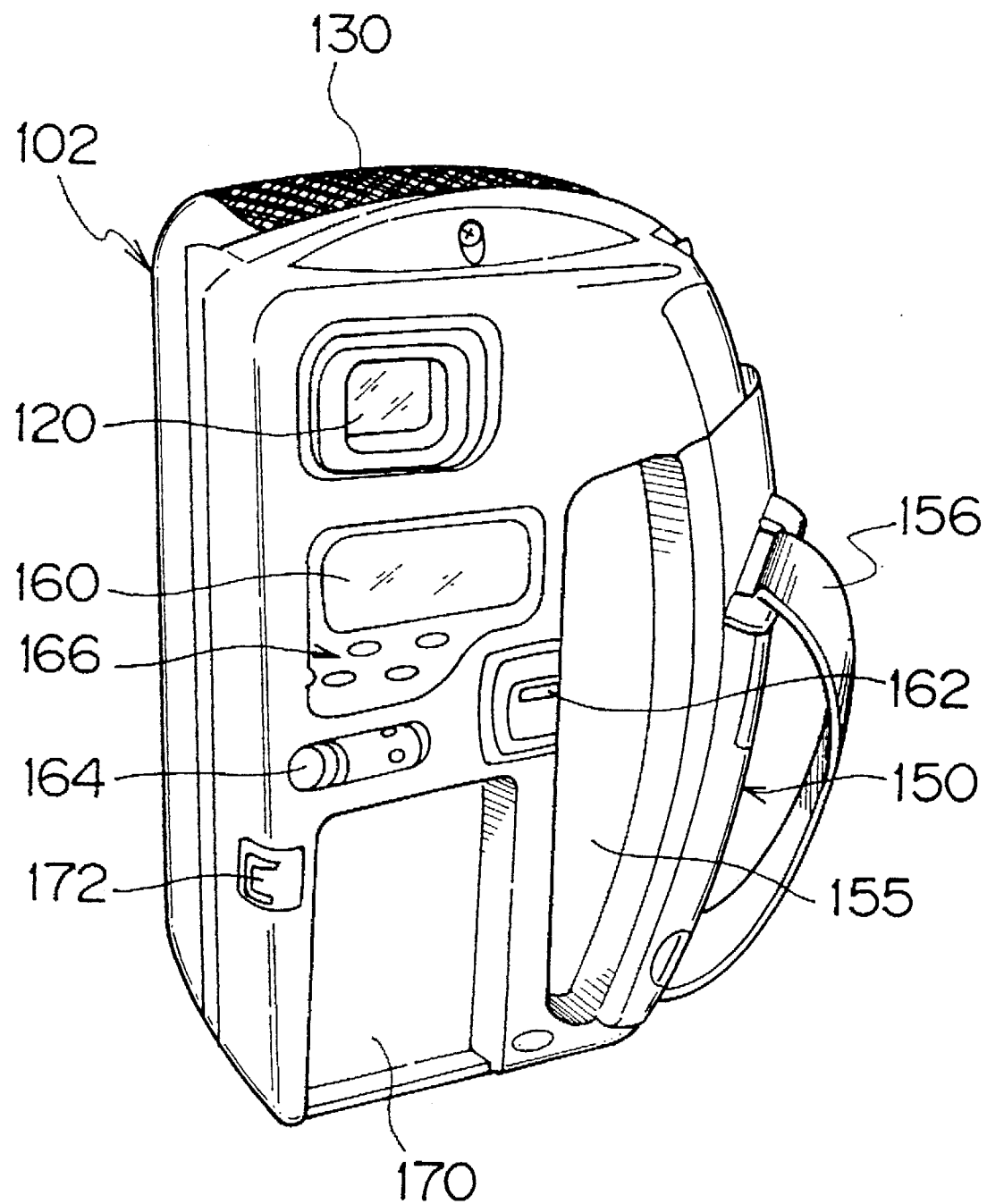
FIG. 2 is an oblique view, in which the VTR integrated with a camera according to the present invention is seen from the rear.

FIGS. 1 and 2 are the oblique views, in which the VTR integrated with a camera according to the present invention is seen from the front and rear, respectively.

As shown in these drawings, an outer case 102 of this VTR 100 integrated with a camera has the shape of a substantially flat rectangular parallelepiped which is short in the direction of the photographing camera (direction, i.e., the shortest dimension of the parallelepiped is substantially parallel to a line pointing to the subject being recorded on video tape (such a line pointing to the subject is indicated by an arrow AB in FIG. 1). As shown in FIG. 1, a taking or recording lens 110 and an optical view finder 120 are provided on the upper portion of a front surface of an outer case 102, the front surface substantially forming a plane substantially perpendicular to the line AB pointing to the subject, and a stereo microphone 130 is positioned on the top of the outer case 102. Designated at 140 is a tape deck, 150 a side grip, 152 a taking or recording button and 154 a tele/wide switching button.

The taking lens 110 is a double-focus lens capable of being changed from a focal distance of a wide angle taking to a focal distance of a telescopic narrow angle (of about 3-time zooming) and vice versa, and, whenever one push of she tele/wide switching button 154 is made, the focal distance is switched off from one to another. Also, this taking lens 110 has a large depth of the field, whereby the lens is designed so be able to focus from the nearest point to the infinite point even when switching is made to either one of the focal distances. Furthermore, the time required for tele/wide switching of the taking lens 110 is about 0.2 sec.

The optical view finder 120 is constructed in such a way that the range of the field thereof is switched in accordance with the switching from one focal distance to the other and vice versa of the taking lens 110, i.e., in accordance with the button operation of the tele/wide switching button 154, so that the range of taking and the range of the field can coincide with each other. Also, this optical view finder 120 use the switching of the magnification of the finder by the lens and the switching of the size of the field frame, so that the above-described range of field can be switched off from each other.

Figure 3:
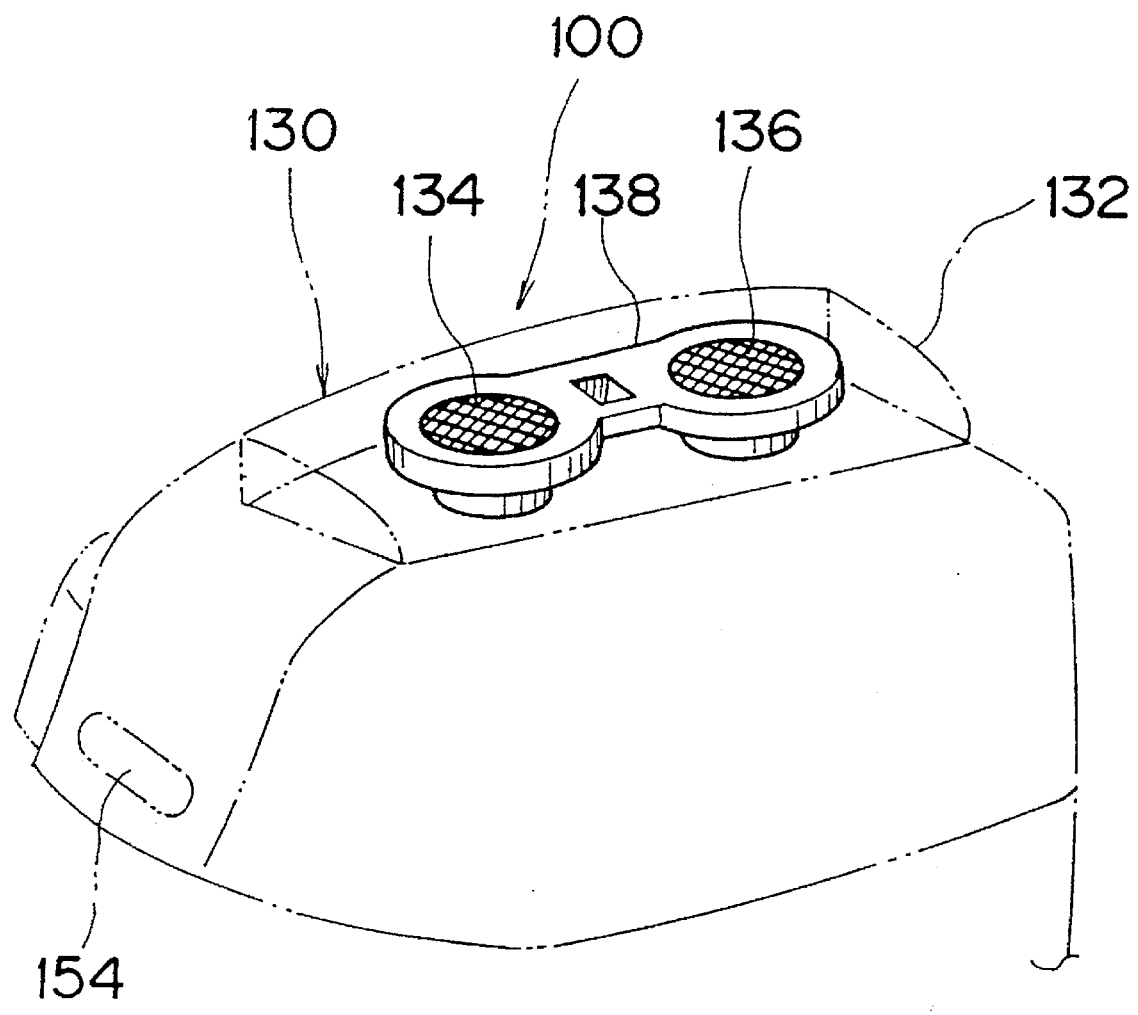
FIG. 3 is a perspective view showing an embodiment of the microphone applied to the VTR integrated with a camera according to the present invention.

As shown in FIG. 3, in the stereo microphone 130 covered by a microphone net 132, there is provided one microphone unit 134 on the right side and the other microphone unit 136 on the left side, both of which are respectively preset at predetermined stereo angles, and these microphone units 134 and 138 are fixed to a microphone holder 138.

As shown in FIG. 1, the tape deck 140 is positioned in such a manner that the surface of a 8mm cassette tape, not shown, is in parallel to the front surface of the outer case 102 and the shortest dimension of the tape is substantially parallel to the line AB pointing to the subject. Furthermore, the tape deck 140 includes a rotary head drum, not shown, a tape loading mechanism, a tape delivery mechanism and the like, and magnetically records and reproduces video signals showing the subject taken by the taking lens 110 and audio signals detected by the stereo microphone 130 by a video tape of the 8 mm cassette. Incidentally, designated by 142 is a lid which is opened or closed at the time of inserting or taking out the cassette, and 144 a cassette eject button.

The side grip 150 is formed to provide a curve, a finger receiving portion 151 is formed at the front surface of the outer case 102, and a concavity 155 where the thumb and a base of the thumb are positioned as shown in FIG. 2 is formed at the rear surface of the outer case 102. Also, denoted by 156 is a grip belt.

The taking button 152 is provided at the front surface of the outer case 102, and operated by a forefinger of a right hand holding the side grip 150. Furthermore, the tele/wide switching button 154 is also provided at a position where the button 154 is operable by the forefinger of the right hand.

On the other hand, a liquid crystal display 160 is positioned at a position adjacent to the undersurface of the optical view finder 120, and, further downwardly thereof, a battery mounting portion 170 is formed. The liquid crystal display 160 is relatively flush with the surface of the optical view finder 120, and the display of the 8 mm cassette tape, date, current time, the remaining amount of a tape, and the reproduction, stopping, fast forwarding, unwinding and the like during the VTR mode.

Furthermore, various buttons and the like are positioned at the rear surface of the outer case 102. Namely, designated by 162 is a power source switch, 164 a mode switching button for switching off from the camera mode to the VTR mode and vice versa, 166 a group of buttons for instructing the reproduction, stopping, fast forwarding, unwinding and the like during the VTR mode, and 172 a battery eject button.

Figure 4:
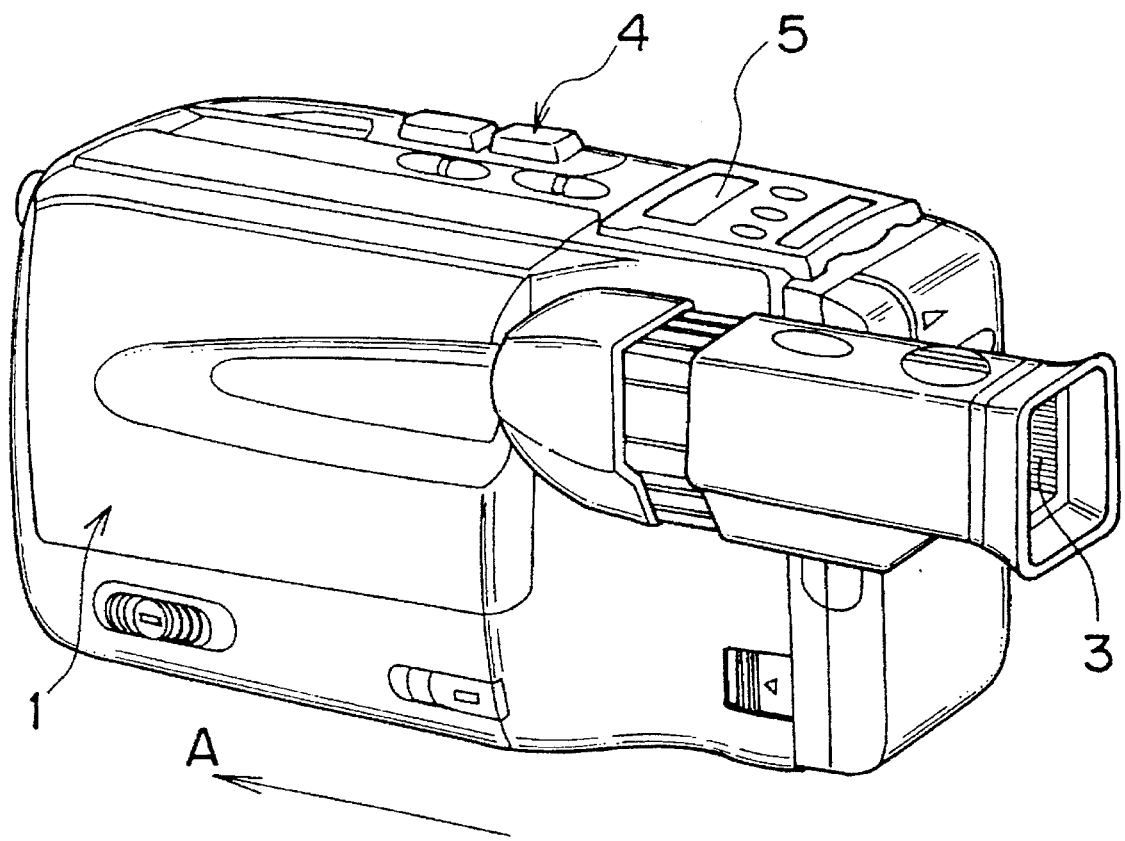
FIG. 4 is an oblique view showing the conventional VTR integrated with a camera.
Figure 5:
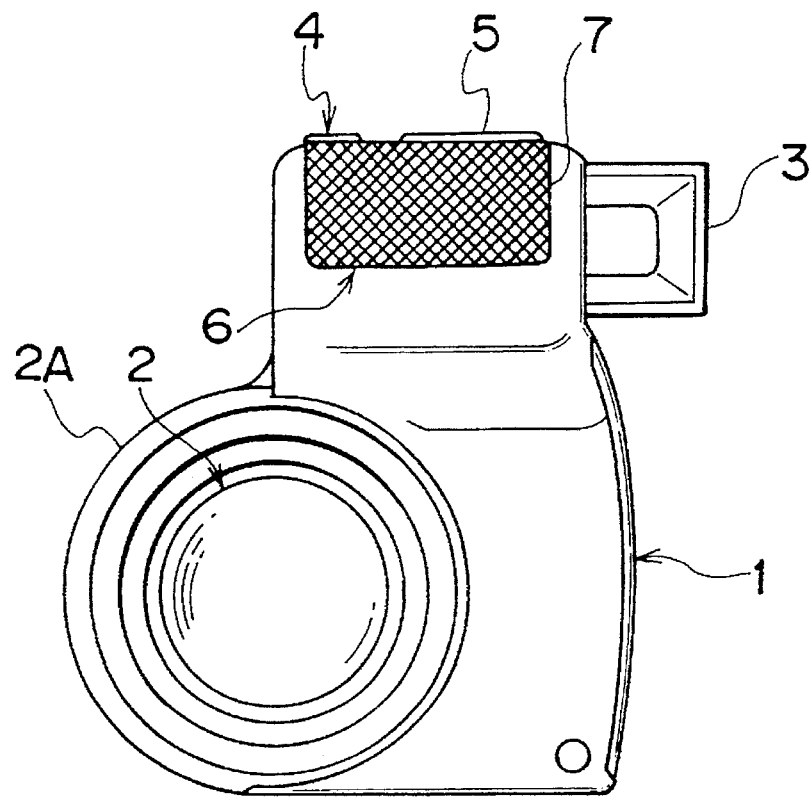
FIG. 5 is a front view showing the conventional VTR integrated with a camera.
Figure 6:
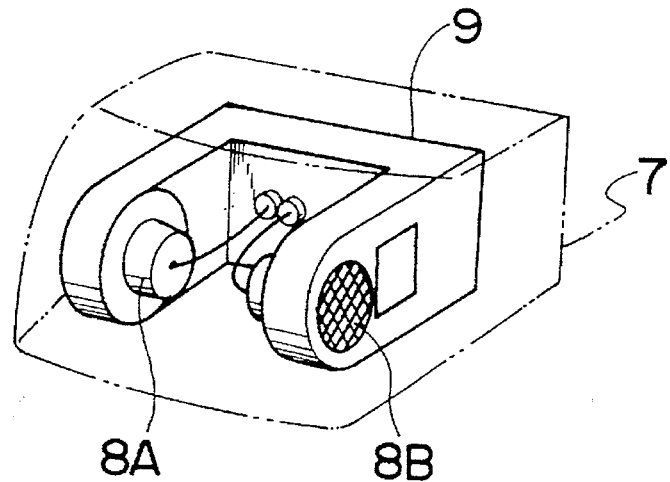
FIG. 6 is a perspective view showing the microphone applied to the conventional VTR integrated with a camera.

In the VTR 100 integrated with a camera, having this arrangement, the outer case 102 thereof is formed to provide the substantially flat rectangular parallelepiped, so that the VTR integrated with a camera, having this arrangement, becomes compact in size greatly and has the excellent portability as compared with the conventional VTR integrated with a camera as shown in FIG. 4, i.e., as compared with the VTR integrated with a camera, having the bulged lens housing 2A and having a thick body.

On the other hand, when the photographing is performed by use of the VTR 100 integrated with a camera, first, the power source switch 162 is operated to start the VTR 100 integrated with a camera, and the mode switching button 164 is pushed to change to the camera mode. Subsequently, the forefinger, middle finger, third finger and little finger of the right hand are inserted under the grip belt 156 and the side grip 150 is held by the right hand. Subsequently, the taking (or recording) button 152 is pushed by the forefinger of the right hand to start the recording while the optical view finder 120 is viewed. Furthermore, even when the tele/wide is switched, similarly, the tele/wide switching button 154 is pushed by the forefinger of the right hand.

During the pushing operation of the taking button 152 and tele/wide switching button 154, the thumb of the right hand is positioned at the concavity 155 at the rear surface of the outer case 102, so that the outer case 102 is supported from the rear surface thereof against the pushing forces of the buttons 152 and 154. That is, the operations of pushing the taking button 182 and the tele/wide switching button 154 are similar to the operation of holding the outer case 102 between the thumb and the forefinger, so that no camera shake is caused when the buttons are operated.

Furthermore, in the VTR 100 integrated with a camera of this embodiment, the liquid crystal display is positioned at a position adjacent to the optical view finder 120, so that the content displayed by the liquid crystal display portion 180 can be immediately recognized at a position where eyes are not diverted from the optical view finder 120.

Further, the stereo microphone 130 of the VTR 100 integrated with a camera of this embodiment is provided on the top of the outer case 102, so that the sounds from behind the VTR 100 integrated with a camera can be recorded. With this arrangement, in the VTR 100 integrated with a camera, the sound quality and realism can be improved as compared in the conventional VTR integrated with a camera.

Also, with regard to the VTR 100 integrated with a camera of this embodiment, the type, to which the optical view finder 120 is applied, has been described, however, the present invention should not necessarily be limited to this, and the type, to which an electronic view finder is applied instead of the optical view finder 120, may be adopted.

Furthermore, with regard to the VTR 100 integrated with a camera of this embodiment, the type having two ranges of field including the tele side and the wide side through the operation of the tele/wide switching button 154 has been described, however, the present invention should not necessarily be limited to this, and the type, in which the zoom button is applied for driving a zoom lens instated of the tele/wide switching button 154 which can continuously adjust the range of field, is adopted.

As has been described hereinabove, in the VTR integrated with a camera according to the present invention, the outer case thereof is formed to provide the substantially flat rectangular parallelepiped, and the tape deck, taking lens and view finder are positioned in this outer case, so that the VTR integrated with a camera according to the present invention can become compact in size and have excellent portability.

Furthermore, during the engaging operation of the taking button and the like by the forefinger of the hand holding the grip portion, the thumb of the hand supports the outer case from the rear surface thereof against the pushing force of the button, so that no camera shake is caused during the operation of the camera.

Further, the liquid crystal display portion is positioned at the position adjacent the optical view finder, so that the content displayed in the liquid crystal display portion can be recognized at the position where the eyes are not diverted from the view finder.

Furthermore, the microphone is provided on the top of the VTR integrated with a camera, and the sounds from behind the VTR integrated with a camera can be recorded, so that the sound quality and realism can be improved.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A video tape recorder integrated with a camera, comprising:

an outer case;

wherein a tape deck, a taking lens and a finder portion are provided in said outer case, wherein said taking lens and said finder portion are arranged side-by-side on top of said tape deck to reduce a height of said video tape recorder integrated with said camera;

said outer case is formed to provide a substantially rectangular parallelepiped, said taking lens is provided in said outer case so that a taking optical axis thereof is positioned substantially in the same direction as a shortest dimension of said outer case, the shortest dimension of said outer case being oriented during operation by a user substantially in the same direction as a line pointing to a subject to be recorded on a video cassette tape, said tape deck is provided in said outer case so that a surface of a video cassette is positioned substantially within said outer case, and a shortest dimension of the video cassette being substantially in the same direction as the line pointing to the subject;

a curved grip portion, provided on a side of said outer case, wherein said curved grip portion reduces camera shake and permits comfortable holding of said video tape recorder;

a finger-receiving portion, formed on a front side of said outer case for receiving fingers other than a thumb of a hand holding said grip portion;

a thumb rest, formed on a back side of said outer case for regulating a position of the thumb of the hand holding said grip portion;

a taking button, provided at a position on a front side of said outer case such that said taking button can be operated by a forefinger of a hand holding said curved grip portion of said outer case during recording, and wherein a force exerted by the forefinger on said taking button is counteracted by a force in the opposite direction, exerted by the thumb on said thumb rest, to thereby further reduce camera shake; and a grip belt, provided for securing the hand holding said grip portion between said curved grip portion and said grip belt.

2. The video tape recorder integrated with the camera of claim 1, further comprising a finder portion provided in said outer case so that a finder optical axis is positioned in substantially, the same direction as the shortest dimension of said outer case.

3. The video tape recorder integrated with the camera of claim 1, wherein said taking lens is a double-focus lens which can be switched from a focal distance of wide angle taking to a focal distance of telescopic taking or vice versa.

4. The video tape recorder integrated with the camera of claim 1, wherein said taking lens is a zoom lens.

5. The video tape recorder integrated with the camera of claim 1, wherein said thumb rest is also concave, whereby fingers other than the thumb are positioned at said finger-receiving portion, and the thumb and a base portion of the thumb are positioned at the concavity, so that said grip portion can be held by a user.

6. The video tape recorder integrated with the camera of claim 1, wherein a zoom button or a tele/wide switching button is provided in a vicinity of said taking button on the front side of said outer case.

7. A video tape recorder integrated with a camera, comprising:

an outer case;

wherein a tape deck, a taking lens, and optical finder are provided in said outer case, wherein said taking lens and said optical finder portion are arranged side-by-side to reduce a height of said video tape recorder integrated with said camera;

said outer case is formed to provide a substantially flat rectangular parallelepiped, said taking lens is provided in said outer case such that a taking optical axis thereof is positioned substantially in the same direction as a shortest dimension of said outer case, the shortest dimension of said outer case being oriented during operation by a user substantially in the same direction as a line pointing to a subject to be recorded on a video cassette tape, said tape deck is provided such that a surface of a video cassette is positioned substantially within said outer case, a shortest dimension of the video cassette being substantially in the same direction as the line pointing to the subject, and a liquid crystal display portion, provided in a position sufficiently near to said optical finder on a back side of said outer case such that a user's eyes are insignificantly diverted when the user looks away from said optical finder toward said liquid crystal display portion;

a curved grip portion, provided on a side of said outer case, wherein said curved grip portion reduces camera shake and permits comfortable holding of said video tape recorder;

a finger-receiving portion, formed on a front side of said outer case for receiving fingers other than a thumb of a hand holding said grip portion;

a thumb rest, formed on a back side of said outer case for regulating a position of the thumb of the hand holding said grip portion;

a taking button, provided at a position on a front side of said outer case such that said taking button can be operated by a forefinger of a hand holding said curved grip portion of said outer case during recording, and wherein a force exerted by the forefinger on said taking button is counteracted by a force in the opposite direction, exerted by the thumb on said thumb rest to thereby further reduce camera shake; and a grip belt, provided for securing the hand holding said grip portion between said curved grip portion and said grip belt.

8. The video tape recorder integrated with the camera of claim 7, further comprising a battery mounted in a concavity formed on a back side of said outer case.

9. The video tape recorder integrated with the camera of claim 7, further comprising a power source switch provided on the back side of said outer case.

10. The video tape recorder integrated with the camera of claim 7, further comprising a plurality of buttons, located on the back side of said outer housing, for reproducing, stopping, fast forwarding, and rewinding the video cassette tape.

11. A video tape recorder integrated with a camera, comprising:

an outer case;

wherein in a VTR deck portion, a taking lens and a finder are provided in said outer case, wherein said taking lens and said finder are arranged side-by side to reduce a height of said video tape recorder integrated with said camera;

said outer case is formed to provide a substantially flat rectangular parallelepiped, said taking lens is provided in said outer case such that a taking optical axis thereof is positioned substantially in the same direction as a shortest dimension of said outer case, the shortest dimension of said outer case being oriented during operation by a user substantially in the same direction as a line pointing to a subject to be recorded on a video cassette tape, said VTR deck portion being provided so that a surface of a video cassette is positioned substantially within said outer case, a shortest dimension of the video cassette being substantially in the same direction as the line pointing to the subject, and a microphone disposed at a top of said outer case;

a curved grip portion, provided on a side of said outer case, wherein said curved grip portion reduces camera shake and permits comfortable holding of said video tape recorder;

a finger-receiving portion, formed on a front side of said outer case for receiving fingers other than a thumb of a hand holding said grip portion;

a thumb rest, formed on a back side of said outer case for regulating a position of the thumb of the hand holding said grip portion;

a taking button, provided at a position on a front side of said outer case such that said taking button can be operated by a forefinger of a hand holding said curved grip portion of said outer case during recording, and wherein a force exerted by the forefinger on said taking button is counteracted by a force in the opposite direction, exerted by the thumb on said thumb rest to thereby further reduce camera shake; and a grip belt, provided for securing the hand holding said grip portion between said curved grip portion and said grip belt.

12. The video tape recorder integrated with the camera of claim 11, wherein said microphone is a stereoscopic type microphone having a first microphone-unit at a right hand side of a top of said outer case and a second microphone-unit at a left hand side of the top of said outer case.

13. A camcorder integrating a video camera and video tape recorder for recording video signals on a video cassette tape comprising:

a rectangular parallelepiped-shaped case enclosing said camcorder, a shortest dimension of said case being oriented during operation by a user substantially in the same direction as a line pointing to a subject to be recorded on the video cassette tape;

a lens whose optical axis is substantially in the same direction as the line pointing to the subject; and a viewfinder whose optical axis is substantially in the same direction as the line pointing to the subject;

wherein said lens and said viewfinder are arranged side-by side to reduce a height of said camcorder;

wherein a video cassette is positioned within said case such that a shortest dimension of the video cassette is substantially in the same direction as the line pointing to the subject;

a curved grip portion, provided on a side of said outer case, wherein said curved grip portion reduces camera shake and permits comfortable holding of said video tape recorder;

a finger-receiving portion, formed on a front side of said outer case for receiving fingers other than a thumb of a hand holding said grip portion;

a thumb rest, formed on a back side of said outer case for regulating a position of the thumb of the hand holding said grip portion;

a taking button, provided at a position on a front side of said outer case such that said taking button can be operated by a forefinger of a hand holding said curved grip portion of said outer case during recording, and wherein a force exerted by the forefinger on said taking button is counteracted by a force in the opposite direction, exerted by the thumb on said thumb rest to thereby further reduce camera shake; and a grip belt, provided for securing the hand holding said grip portion between said curved grip portion and said grip belt.

14. The camcorder of claim 13, further comprising:

an LCD display positioned sufficiently near to the viewfinder such that a user's eyes are insignificantly diverted when the user looks away from the viewfinder toward the LCD display.

15. The camcorder of claim 13, further comprising:

microphone means for collecting audio information to be recorded on the video cassette tape;

said microphone means forming a first side of said case;

the first side substantially forming a plane, the plane being substantially parallel to the line pointing to the subject;

the first side being substantially horizontal during normal orientation of said case by the user;

said microphone means being positioned such that sounds from a direction opposite to the subject are received as well as sounds received from a direction of the subject.

16. The camcorder of claim 13, wherein:

said grip portion being formed along a longest dimension of said case, the longest dimension of said case being oriented during operation by the user substantially vertical and parallel to the line pointing to the subject to be recorded;

the grip portion being formed in a shape complementary to that of a user's palm, the user gripping the grip portion via opposing forces generated between the user's thumb and at least a first of the remaining fingers.

17. The camcorder of claim 16, wherein:

the first side is opposite a second side, the second side substantially forming a plane, the plane being substantially parallel to the line pointing to the subject;

the second side being substantially vertical when the user grips the grip portion;

the grip portion being arcuate in the longest dimension of said case, a center area of the grip portion being farther away from the second side than end areas of the grip portion.

18. The camcorder of claim 17, wherein:

a center of mass of said camcorder is located near the grip portion thereby presenting a balanced feel to the user.

19. The camcorder of claim 16, further comprising:

a recording button by which the user initiates or interrupts recording;

the recording button being positioned in the grip portion such that the user can continue to grip the grip portion while using at least a second of the remaining fingers to actuate the recording button.

\* \* \* \* \*